(12) United States Patent
Cline et al.

(10) Patent No.: US 6,298,148 B1
(45) Date of Patent: Oct. 2, 2001

(54) METHOD OF REGISTERING SURFACES USING CURVATURE

(75) Inventors: Harvey Ellis Cline, Schenectady; William Edward Lorensen, Ballston Lake, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/274,010

(22) Filed: Mar. 22, 1999

(51) Int. Cl.$^7$ .................................................. G06K 9/00
(52) U.S. Cl. .................................................. 382/128
(58) Field of Search .................................. 382/100, 106, 382/108, 128, 173, 180, 181, 209, 276, 282, 283, 293, 294, 295; 73/596, 640

(56) References Cited

U.S. PATENT DOCUMENTS

| | | | |
|---|---|---|---|
| 3,617,016 | * 11/1971 | Bolsey | 244/3.16 |
| 3,805,238 | * 4/1974 | Rothfjell | 382/118 |
| 4,055,833 | * 10/1977 | Rothfjell | 382/118 |
| 4,637,058 | * 1/1987 | Ross et al. | 382/291 |
| 4,719,585 | 1/1988 | Cline et al. | 345/424 |
| 4,821,210 | * 4/1989 | Rumbaugh | 345/421 |
| 4,821,213 | 4/1989 | Cline et al. | 345/424 |
| 5,142,659 | * 8/1992 | Rao et al. | 382/106 |
| 5,163,094 | * 11/1992 | Prokoski et al. | 382/118 |
| 5,726,705 | * 3/1998 | Imanishi et al. | 348/92 |
| 5,740,802 | 4/1998 | Nafis et al. | 475/120 |
| 5,931,667 | * 8/1999 | Papandreas | 433/8 |
| 5,936,628 | * 8/1999 | Kitamura et al. | 345/420 |
| 6,173,068 | * 1/2001 | Prokoski | 382/115 |

OTHER PUBLICATIONS

Gabriel Taubin, "Estimating the Tensor of Curvature of a Surface from a Polyhedral Approximation", IBM Research Report RC–19860 (#87826), Dec. 5, 1994.

Lorensen et al., "Marching Cubes: A High Resolution 3D Surface Construction Algorithm", Computer Graphics, vol. 21, No. 4, Jul. 1987, pp. 163–169.

* cited by examiner

Primary Examiner—Leo Boudreau
Assistant Examiner—Shervin Nakhjavan
(74) Attorney, Agent, or Firm—Jean K. Testa; Donald S. Ingraham

(57) ABSTRACT

A patient surface is registered with a model surface based on curvature by acquiring patient range data and determining the curvature of the patient surface based on the range data. The patient surface is generated and shaded based on the curvature. A model surface is generated from image data and processed to determine the curvature of the model surface. The model surface is shaded to represent the curvature. The shaded patient surface and the shaded model surface are aligned in registration with each other by manipulating the patient surface and/or the model surface until the curvature features coincide.

12 Claims, 3 Drawing Sheets

METHOD OF REGISTERING SURFACES USING CURVATURE

BACKGROUND OF THE INVENTION

The invention relates to a method of registering surfaces using curvature data and in particular to a method of registering a patient surface created from patient range data with a model surface created from patient image data.

Three-dimensional models of a patient, derived using medical imaging techniques (e.g. CT, MR), are useful in both planning and performing surgical procedures. U.S. Pat. No. 5,740,802, assigned to the assignee of the present application, discloses a system that aligns live video of the patient and models generated from medical imaging to facilitate surgery. In smooth regions, without prominent landmarks, it is difficult to align the image data with the model data.

BRIEF SUMMARY OF THE INVENTION

An exemplary embodiment of the invention is directed to a method of registering a generated patient surface with a model surface based on curvature. The method includes acquiring patient range data and determining the patient curvature based on the range data. A patient surface is generated and shaded based on the patient curvature. A model surface is generated from image data and processed to determine the curvature of the model surface. The model surface is shaded to represent the model curvature. The shaded patient surface and the shaded model surface may be aligned by manipulating the patient surface and/or the model surface until the curvature features coincide.

DETAILED DESCRIPTION OF THE INVENTION

Figure 1:
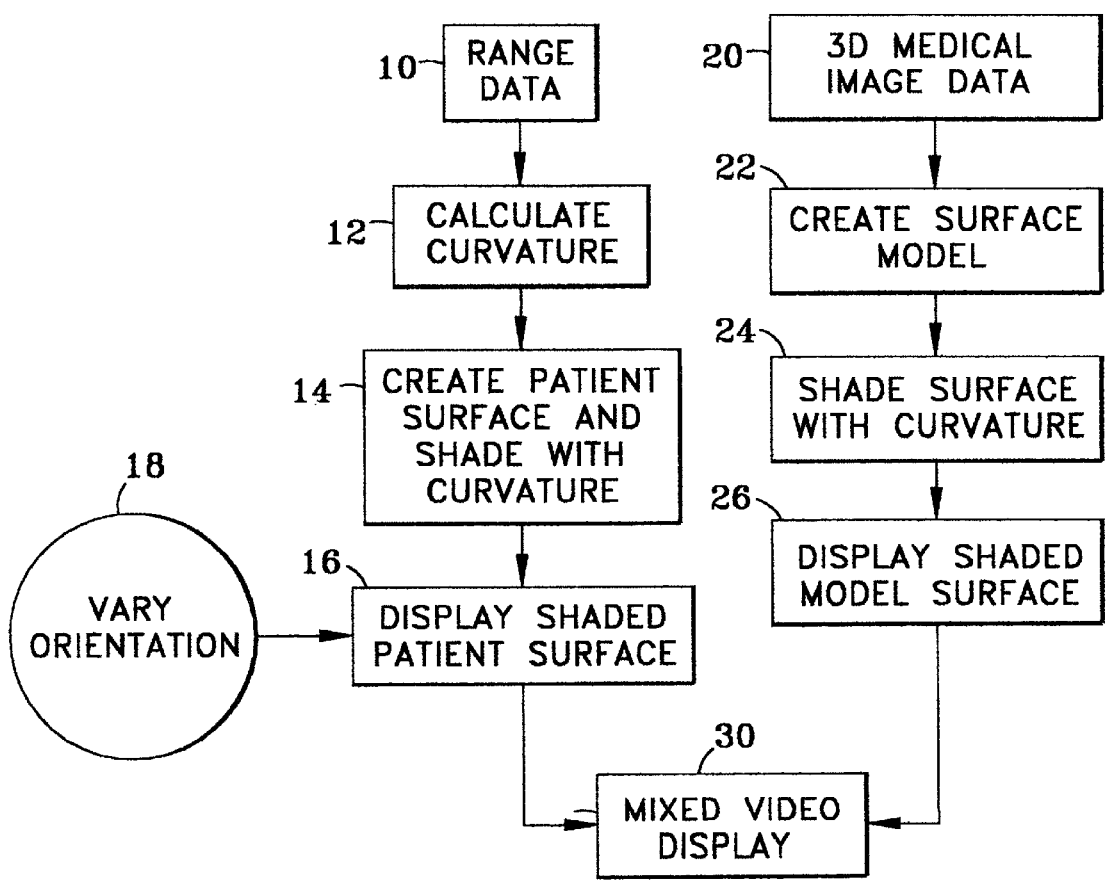
FIG. 1 is a flowchart depicting a method of registering two surfaces.

FIG. 1 illustrates, in flowchart form, a method of registering a patient surface with a model surface in an exemplary embodiment of the invention. At step 10, range data are obtained from the patient. The range data may be derived from direct measurement (e.g. optical range data, coordinate measuring machines, etc.). At step 20, image data representing the patient are obtained and may be provided from a variety of medical imaging techniques. At step 12, the curvature of the range data is determined using either the mean curvature or the Gaussian curvature described herein.

Figure 3:
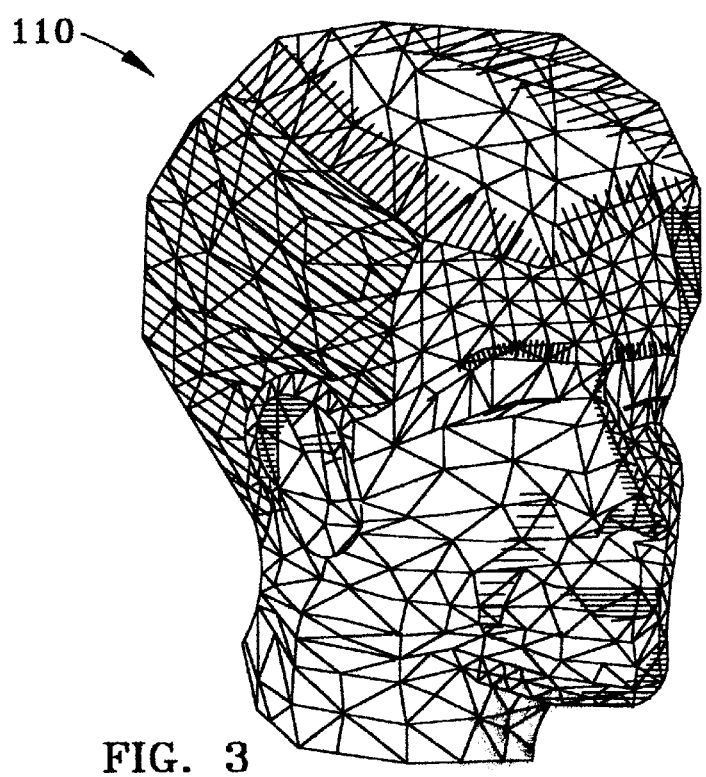
FIG. 3 illustrates a model surface shaded with curvature.

At step 22, a model is created from the image data and the model surface curvature is determined. A system for creating surfaces from volumetric data has been described in U.S Pat. No. 4,821,213, Cline, Ludke, Lorensen, Apr. 11, 1989, "System For The Simultaneous Display Of Two Or More Internal Surfaces Within A Solid Object" ("Marching Cubes Method"). The "Marching Cubes Method" produces surfaces efficiently; however as the number of volumetric data points becomes larger, it becomes more feasible to use another method, specifically that described in U.S. Pat. No. 4,719,585, Jan. 12, 1988, Cline, Ludke, Lorensen, "Dividing Cubes System And Method For The Display Of Surface Structures Contained Within The Interior Region Of A Solid Body" ("Dividing Cubes Method"). The dividing cubes method subdivides each voxel into points and normals using trilinear interpolation. The points and normals represent surfaces which are rendered. A modified marching cubes method may be used in step 22 to create the model surface and determine the curvature of the model surface. The marching cubes method yields a surface composed of triangles which may be used to calculate the curvature using the method of Gabriel Taubin described in IBM Research Report RC-19860 entitled "Estimating the Tensor of Curvature of a Surface from a Polyhedral Approximation." The model surface is shaded to indicate curvature at step 24. The shading may be any visible indicia (e.g. color or gray scale) and different indicia are used to indicate different curvature values. FIG. 3 illustrates a polygonal model 110 of the patient shaded to indicate curvature.

Figure 2:
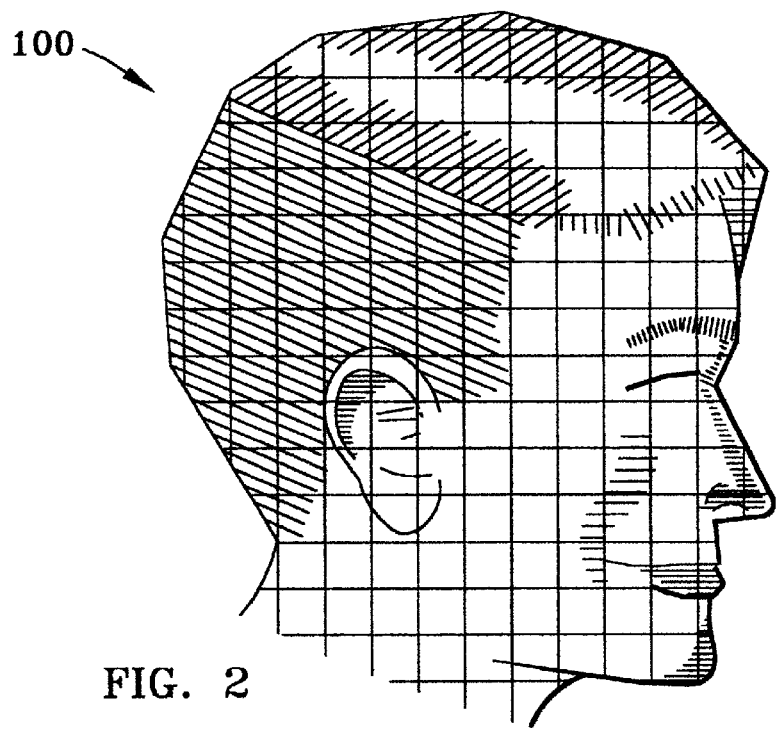
FIG. 2 illustrates a patient surface which has been shaded with curvature.

At step 14, a patient surface corresponding to the range data is generated and this patient surface is shaded to indicate the curvature. The patient surface may be generated from the range data by representing the range data with triangles lying in a plane (e.g. x-y plane) and then deforming the plane in another dimension (e.g. z) to obtain a polygonal model. FIG. 2 illustrates the patient surface 100 shaded to indicate curvature.

Figure 4:
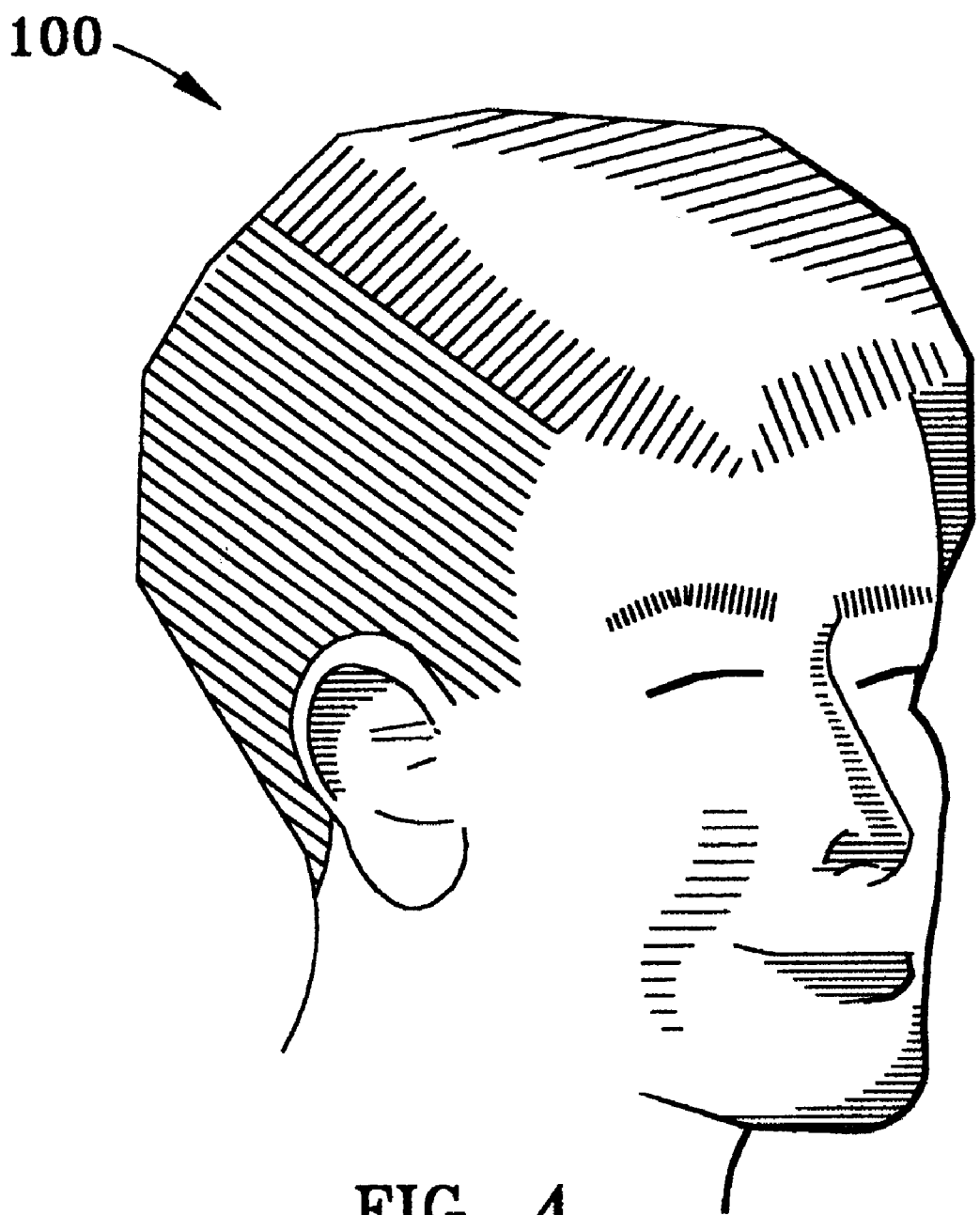
FIG. 4 illustrates the patient surface oriented with the model surface.

At steps 16 and 26, the shaded patient surface and the shaded model surface, respectively, are displayed. At step 18, orientation of the patient surface is varied so that the patient surface is aligned with the model surface. It well be understood that the model surface may be varied in orientation or the orientation of both the patient surface and the model surface may be varied to align the two images. FIG. 4 illustrates the patient surface 100 oriented in the same manner as the model surface of FIG. 3. At step 30, the images of the patient surface and model surface are mixed and displayed.

The process of determining the curvature of the patient surface shown in step 12 is now be described. Curvature is defined for a surface as the rate of change of the normal vector with arc length. For a surface, there are two principle curvatures. In a Cartesian coordinate system, at a point on the surface with the normal direction lying along the z-axis, the change in normal vector dn is related to the displacements dx and dy in the surface as follows:

$$dn_x = k_{xx} dx + k_{xy} dy$$

$$dn_y = k_{yx} dx + k_{yy} dy$$

where $k_{xx}$, $k_{xy}$, $k_{yx}$ and $k_{yy}$ are curvature constants.

The mean curvature $K_m = (k_{xx} + k_{yy})/2$ and the Gaussian curvature $K_g = k_{xx} k_{yy} - k_{xy} k_{yx}$ are surface properties and remain invariant for rotations of the surface. The rotational invariance of both the mean curvature and the Gaussian curvature are useful in displaying the patient surface with curvature shading. If the patient surface orientation is varied, the curvature shading will not vary, which facilitates alignment of the patient surface and the model surface.

The curvature constants, nine altogether, are calculated from the patient data by taking the central differences of the normal vectors along the three axes $$k_{xx} = [n_x(x+a, y, z) - n_x(x-a, y, z)]/2a$$

$$k_{xy} = [n_x(x, y+b, z) - n_x(x, y-b, z)]/2b$$

$$k_{xz} = [n_x(x, y, z+c) - n_x(x, y, z-c)]/2c$$

$$k_{zz}=[n_z(x, y, z+c)-n_z(x, y, z-c)]/2c$$

where a, b, c are the spacings between sampled points. The mean curvature for a surface with arbitrary orientation is given by the trace of the 3×3 curvature matrix $$k_m=(k_{xx}+k_{yy}+k_{zz})/2$$

and the Gaussian curvature is given by the sum of the diagonal minor determinants $$k_g=(k_{xx}k_{yy}-k_{xy}k_{yx})+(k_{yy}k_{zz}-k_{yz}k_{zy})+(k_{zz}k_{xx}-k_{xz}k_{zx}).$$

In the case of the normal vector lying along a principle axis, these formulas reduce to the usual special cases for the surfaces described above.

The invention can be embodied in the form of computer-implemented processes and apparatus for practicing those processes.

The invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The invention can also be embodied in the form of computer program code, for example, whether stored in a storage medium, loaded into and/or executed by a computer, or transmitted over a communication medium such as electrical wiring or cabling, fiber optics, or via electromagnetic radiation; in each instance, when the computer program code is loaded into and executed by a computer, the computer becomes an apparatus for practicing the invention. When implemented on a general-purpose microprocessor, the computer program code segments configure the microprocessor to create specific logic circuits.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for registering surfaces comprising:

acquiring a first surface from a body to be imaged, said first surface having a curvature;

acquiring a second surface from said body;

determining a first curvature of said first surface, wherein the step of determining a first curvature comprises determining a mean curvature, wherein, in a Cartesian coordinate system, said mean curvature is represented as $$K_m=(k_{xx}+k_{yy})/2,$$

where $$k_{xx}=[n_x(x+a, y, z)-n_x(x=a, y, z)]/2a;$$

and $$k_{yy}=[n_y(x, y+b, z)-n_y(x, y-b, z)]/2b,$$

and where $n_x$ and $n_y$ represent vectors in the x and y directions, respectively, when the direction normal to each of said first and second curvatures is in the z direction, and a, b, and c are the spacings between sampled points;

determining a second curvature of said second surface;

shading said first surface in response to said first curvature;

shading said second surface in response to said second curvature; and varying orientation of at least one of said first surface and said second surface to align said first surface and said second surface in registration with each other.

2. The method for registering surfaces of claim 1 wherein the step of determining a second curvature includes the step of processing said second surface with marching cubes.

3. The method for registering surfaces of claim 1 wherein said first surface represents a patient and is generated from patient range data.

4. The method for registering surfaces of claim 3 wherein said second surface represents a patient and is generated from image data.

5. The method for registering surfaces of claim 3 wherein said second surface represents a patient and is generated from image data.

6. A method for registering surfaces comprising:

acquiring a first surface from a body to be imaged, said first surface having a curvature;

acquiring a second surface from said body;

determining a first curvature of said first surface, wherein the step of determining a first curvature comprises determining a Gaussian curvature, wherein said Gaussian curvature is represented as:

$$K_g=k_{xx}k_{yy}-k_{xy}k_{yx},$$

where $$k_{xx}=[n_x(x+a, y, z)-n_x(x-a, y, z)]/2a;$$

$$k_{yy}=[n_y(x, y+b, z)-n_y(x, y-b, z)]/2b;$$

$$k_{xy}=[n_x(x, y+b, z)-n_x(x, y-b, z)]/2b;$$

and $$k_{yx}=[n_y(x+a, y, z)-n_y(x-a, y, z)]/2a,$$

and wherein $n_x$ and $n_y$ represent vectors in the x and y directions, respectively, when the direction normal to each of said first and second curvatures is in the z direction, and a, b, and c are the spacing between sampled points;

determining a second curvature of said second surface;

shading said first surface in response to said first curvature;

shading said second surface in response to said second curvature; and varying orientation of at least one of said first surface and said second surface to align said first surface and said second surface in registration with each other.

7. A storage medium encoded with machine-readable computer program code for registering surfaces comprising instructions for causing a computer to implement a method of:

acquiring a first surface from a body to be imaged, said first surface having a mean curvature wherein, in a Cartesian coordinate system, said mean curvature is represented as $$K_m = (k_{xx} + K_{yy})/2$$

where $$k_{xx} = [n_x(x+a, y, z) - n_x(x-a, y, z)]/2a,$$

and;

$$k_{yy} = [n_y(x, y+b, z) - n_y(x, y-b, z)]/2b,$$

and wherein $n_x$ and $n_y$ represent vectors in the x and y directions, respectively, where the direction normal to each of said first and second curvatures is in the z direction, and a, b, and c are the spacing between samples points;

acquiring a second surface from said body;

determining a first curvature of said first surface;

determining a second curvature of said second surface;

shading said first surface in response to said first curvature;

shading said second surface in response to said second curvature; and varying orientation of at least one of said first surface and said second surface so as to align said first and second surface in registration with each other.

8. The storage medium of claim 7 wherein said medium is adapted to determine said second curvature by processing said second surface with a marching cubes process.

9. The storage medium of claim 7 where in said first surface represents a patient and said storage medium includes instructions for causing the computer to generate said first surface from patient range data.

10. The storage medium of claim 9 wherein said second surface represents a patient and said storage medium includes instructions for causing the computer to generate said second surface from patient range data.

11. The storage medium of claim 7 wherein said second surface represents a patient and said storage medium includes instructions for causing the computer to generate said second surface from patient image data.

12. A storage medium encoded with machine-readable computer program code for registering surfaces comprising instructions for causing a computer to implement a method of:

acquiring a first surface from a body to be imaged, said first surface having a Gaussian curvature, wherein said Gaussian curvature is represented as $$K_g = k_{xx}k_{yy} - k_{xy}k_{yx},$$

where $$k_{xx} = [n_x(x+a, y, z) - n_x(x-a, y, z)]/2a;$$

$$k_{yy} = [n_y(x, y+b, z) - n_y(x, y-b, z)]/2b;$$

$$k_{xy} = [n_x(x, y+b, z) - n_x(x, y-b, z)]/2b;$$

and $$k_{xy} = [n_y(x+a, y, z) - n_y(x-a, y, z)]/2a,$$

and wherein $n_x$ and $n_y$ represent vectors in the x and y directions, respectively, when the direction normal to each of said first and second curvatures is in the z direction, and a, b, and c are spacings between sampled points;

acquiring a second surface from said body;

determining a first curvature of said first surface, determining a second curvature of said second surface;

shading said first surface in response to said first curvature;

shading said second surface in response to said second curvature; and varying orientation of at least one of said first surface and said second surface so as to align said first and second surface in registration with each other.

* * * * *